United States Patent [19]

Fleischer

[11] 4,335,900
[45] Jun. 22, 1982

[54] COLLAPSIBLE FRAMES FOR BABY CARRIERS

[76] Inventor: Henry Fleischer, 18 Notch Park Rd., Little Falls, N.J. 07424

[21] Appl. No.: 212,071

[22] Filed: Dec. 1, 1980

Related U.S. Application Data

[60] Division of Ser. No. 927,280, Jul. 24, 1978, Pat. No. 4,256,325, which is a continuation-in-part of Ser. No. 759,081, Jan. 13, 1977, abandoned.

[51] Int. Cl.³ ............................................... B62B 11/00
[52] U.S. Cl. ..................................... 280/649; 280/650
[58] Field of Search ............... 280/650, 649, 648, 647, 280/42, 642, 643, 646

[56] References Cited

U.S. PATENT DOCUMENTS

| | | | |
|---|---|---|---|
| 1,779,742 | 10/1930 | Lines | 280/649 |
| 4,025,088 | 5/1977 | Rothschild | 280/650 |
| 4,077,640 | 3/1978 | Perego | 280/650 |

Primary Examiner—Robert R. Song

[57] ABSTRACT

A collapsible stroller frame is provided which includes seat support means, a pair of spaced apart front leg members upper portions of which are pivotally connected to the seat support means, a pair of spaced apart rear leg members upper portions of which include sliding means slidably engaged by the seat support means, handle support means a lower portion of which is connected to the seat support means and an upper portion being in telescoping relation to the lower portion, side bracing means connected to the sliding means of the rear leg members or to a portion of the seat support means, and upper bracing means in telescoping relation to the lower bracing means and operatively connected to the handle support means. The frame is collapsed by moving the upper portion of the handle support means downwardly which causes the upper bracing means to move downwardly and the sliding means of the rear leg members to move forwardly carrying the rear leg members backwardly and swinging same upwardly toward the rear of the seat support means, and the seat support means pivots downwardly causing the front leg members and rear leg members to extend in opposite directions.

6 Claims, 8 Drawing Figures

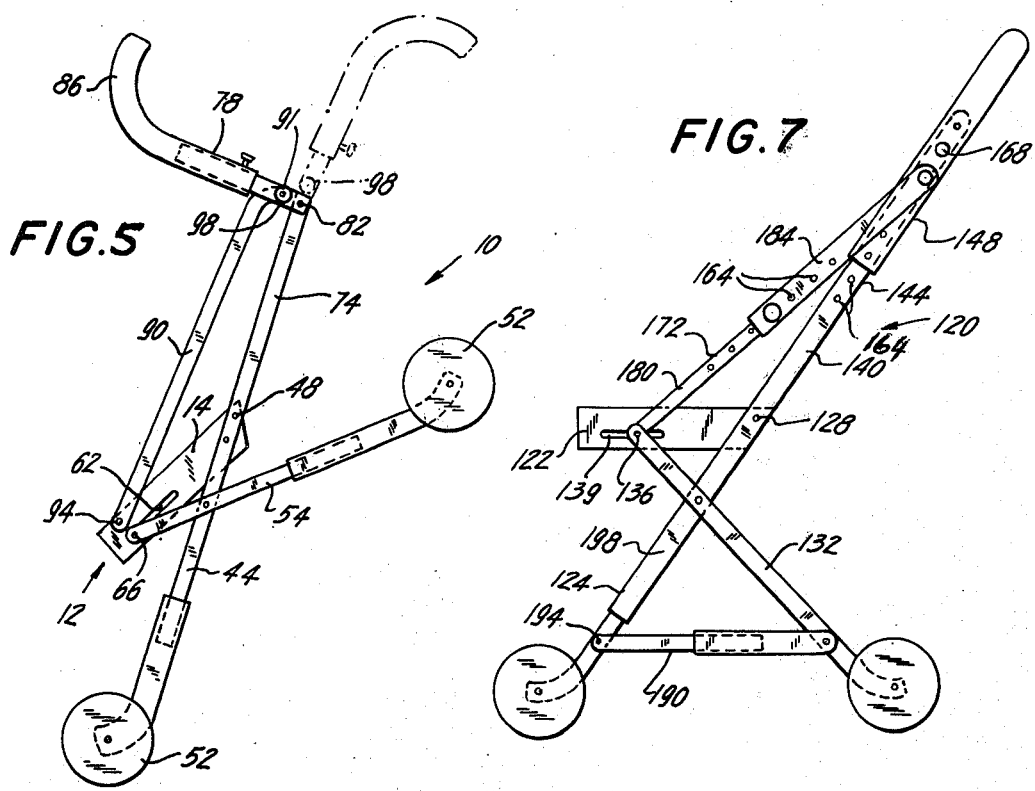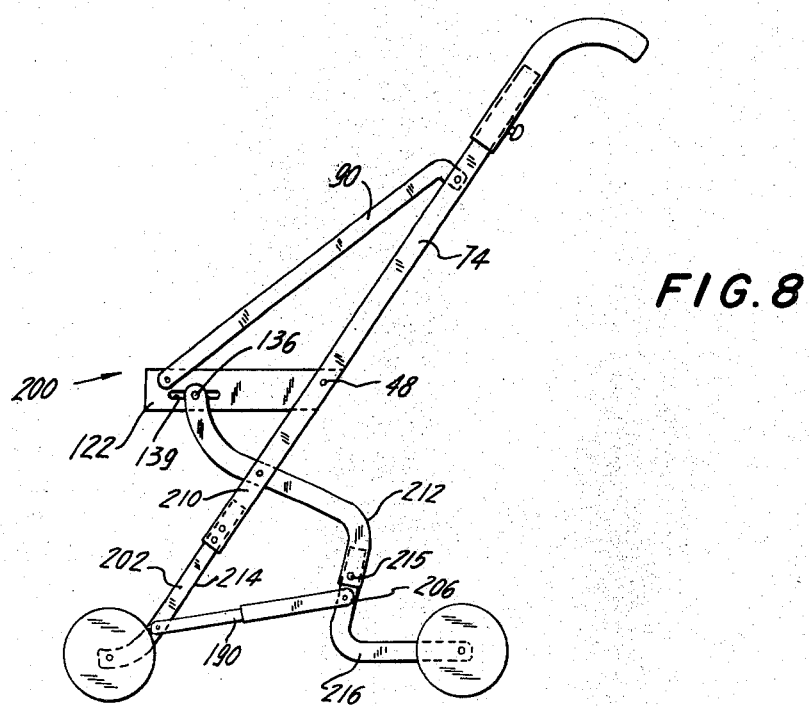

COLLAPSIBLE FRAMES FOR BABY CARRIERS

REFERENCE TO OTHER APPLICATIONS

This is a division, of application Ser. No. 927,280, filed July 24, 1978, now U.S. Pat. No. 4,256,325, which is a continuation-in-part of application Ser. No. 759,081, filed Jan. 13, 1977, now abandoned.

FIELD OF THE INVENTION

The present invention relates to collapsible frames for use as strollers, carriages, high chairs and the like adapted to be employed in conjunction with carriers or seats.

BACKGROUND OF THE INVENTION

The choice in child carrying and securing devices and frames existing in the marketplace today in endless. There are many different types of devices and frames serving the same or different functions. Thus, the prospective buyer asks not only what brand of device to buy but whether frames and carriers comprising car beds, car seats, infant seats, youth seats, high chairs, bathinettes, carriages, strollers, walkers, etc., are all actually necessary. Of course, each of these devices plays an important function at one time or another. But where are they all to be stored? How is one able to pay for all of them? Unfortunately, until now, the new parent had no real answers to these questions. These items are necessities so that the parent was required to purchase each device, including frame and carrier, and somehow make the necessary storage room therefor.

The present invention provides a real solution to the problem of providing each of the child holding, carrying and supporting functions discussed above in a manner so as to require a minimum of expense and storage capacity.

BRIEF STATEMENT OF THE INVENTION

In accordance with the present invention, a collapsible frame for a stroller or other type carrier is provided which includes seat support means including spaced apart side portions, a rear portion, intermediate portion and front portion and slot means extending from the intermediate portion toward the front portion of the seat support means, a pair of spaced apart front leg members, the seat support means being pivotally connected to upper portions of the front leg members, a pair of spaced apart rear leg members upper portions of which are slidably engaged in the slot means of the seat support means, handle support means, a lower portion of which is connected to the seat support means, an upper portion of the handle support means including pivot means dividing the handle support means into an upper segment and a lower segment, side bracing means one end portion of which is pivotally connected to a front portion of the seat support means and the other end portion of which is connected to the upper segment of the handle support means above the pivot means thereof.

Where it is desired to collapse the above frame, upon pivoting the upper segment of the handle support means downwardly toward the front (or back) portion of the seat support means, the side bracing means is moved downwardly causing the front portion of the seat support means to pivot downwardly and toward the front leg members, and the rear leg members to slide forward in the seat support means toward the front portion thereof. The rear leg members are thereby lifted under the seat support means and extend in opposite directions from said front leg members.

In another embodiment of the frame of the invention there are provided seat support means including spaced apart side portions, a rear portion, intermediate portion and front portion, a pair of spaced apart front leg members, the seat support means being pivotally connected to upper portions of the front leg members, a pair of spaced apart rear leg members upper portions of which including sliding means which are slidably engaged by the seat support means, handle support means comprising a lower portion connected to the seat support means, and an upper portion in telescoping relation to the lower portion and further including lock means for fixing the position of the upper portion and the lower portion of the handle support means with respect to each other, and side bracing means including lower bracing means in communication with the sliding means of the rear leg members, and upper bracing means in telescoping relation to the lower bracing means and operatively connected to the upper portion of said handle support means. In collapsing the above frame, upon releasing the lock means of the handle support means, the upper portion of the handle support means moves downwardly toward the lower portion thereby causing the upper bracing means to move downwardly toward the seat support means and the sliding means of the rear leg members to move toward the front portion of the seat support means carrying the rear leg members backwardly swinging the rear members upwardly toward the rear of the seat support means, the seat support means pivoting downwardly toward the front leg members, so that the front leg members and rear leg members extend in opposite directions when in folded or collapsed condition.

In the frame of the invention as described herein, as the frame is collapsed, the right front and back legs are adapted to slide upwardly on each other and the left front and back legs are adapted to slide upwardly on each other. Thus, the front legs or back legs may include slots and the back legs or front legs, respectively, extend through such slots to facilitate the aforedescribed sliding movement of the legs.

The legs of the frame of the invention may be extendable to a desired height (for example by telescoping) so that the frame may be employed as a stroller or a high chair. Furthermore, handle support members may be extendable as well.

In other embodiments of the frame as described above, the right front leg and right back leg include a common pivot point and the left front leg and left back leg include a common pivot point; alternatively, the right front leg and left back leg include a common pivot point and the left front leg and said right back leg include a common pivot point.

In one of the preferred embodiments, the frame includes track means disposed on the seat support means or the undersurface of a seat itself, the upper ends of the back legs being adapted to slide forwardly on the track means upon collapsing of the frame and the seat being adapted to pivot downwardly upon collapsing of the frame. Handle track means may be disposed on the handle support members; in such case, the seat support means will include track engaging means engaged with the handle track means for moving the seat up or down to a desired position.

BRIEF DESCRIPTION OF THE ACCOMPANYING FIGURES

FIG. 5 is a side view of the frame of FIG. 1 in a partially collapsed state;

FIG. 7 is a side schematic view of another collapsible frame in accordance with the present invention;

FIG. 8 is still another embodiment of a collapsible frame in accordance with the present invention.

DETAILED DESCRIPTION OF ACCOMPANYING FIGURES AND PREFERRED EMBODIMENTS OF THE INVENTION

Figure 1:
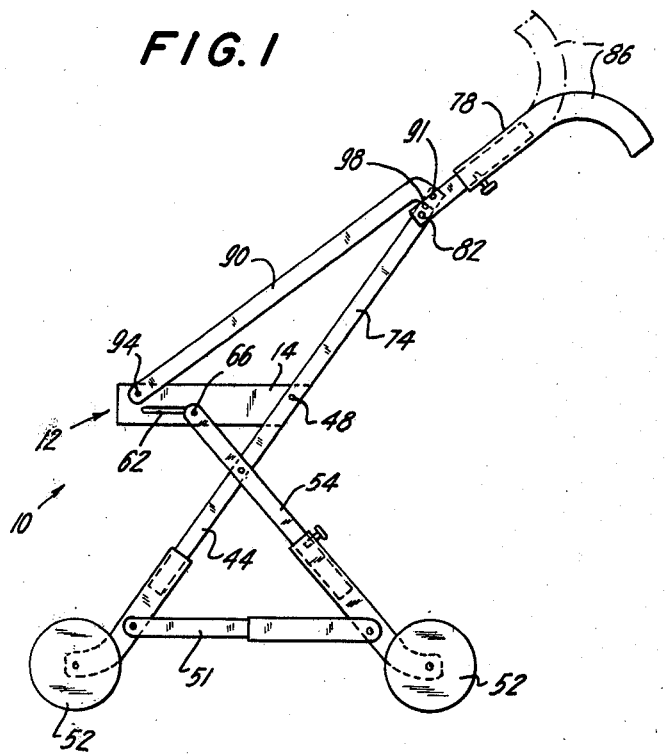
FIG. 1 is a side schematic view of a collapsible frame in accordance with the present invention in its open position.
Figure 3:
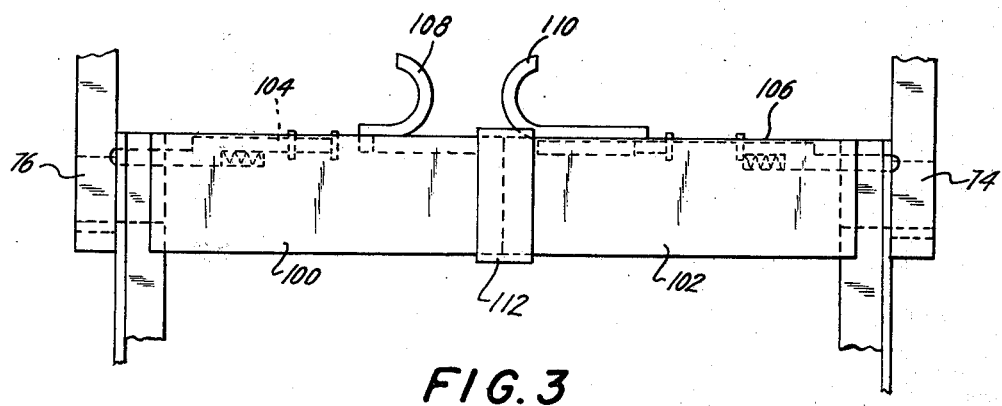
FIG. 3 is a plan view of a portion of the frame of FIG. 1.
Figure 2:
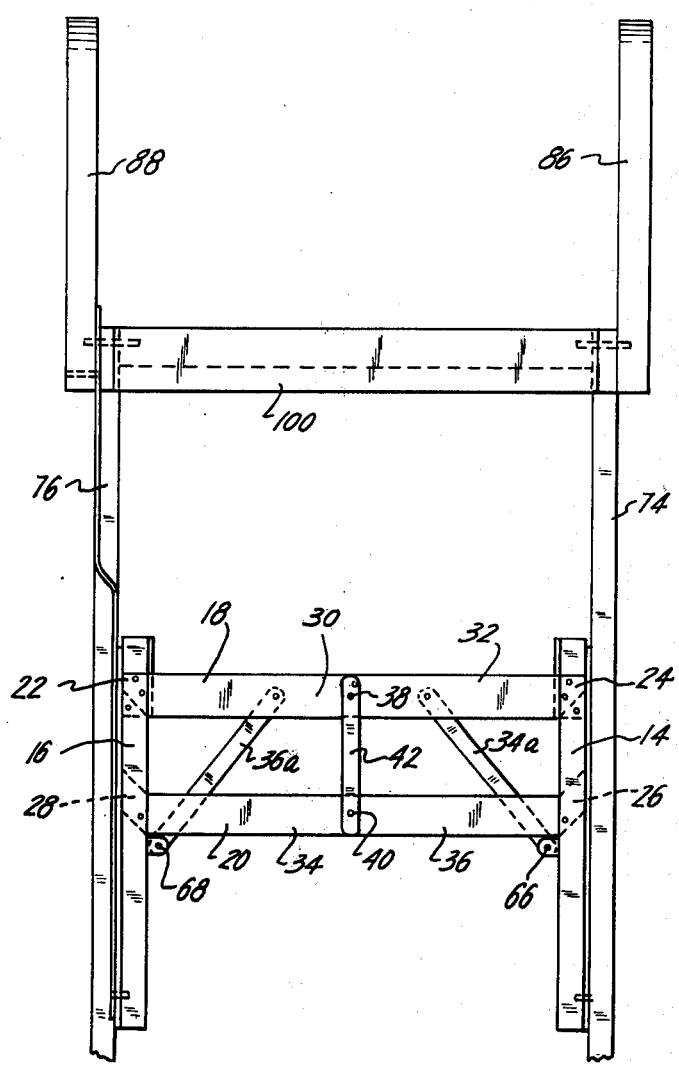
FIG. 2 is a plan view of a portion of the frame of FIG. 1.
Figure 4:
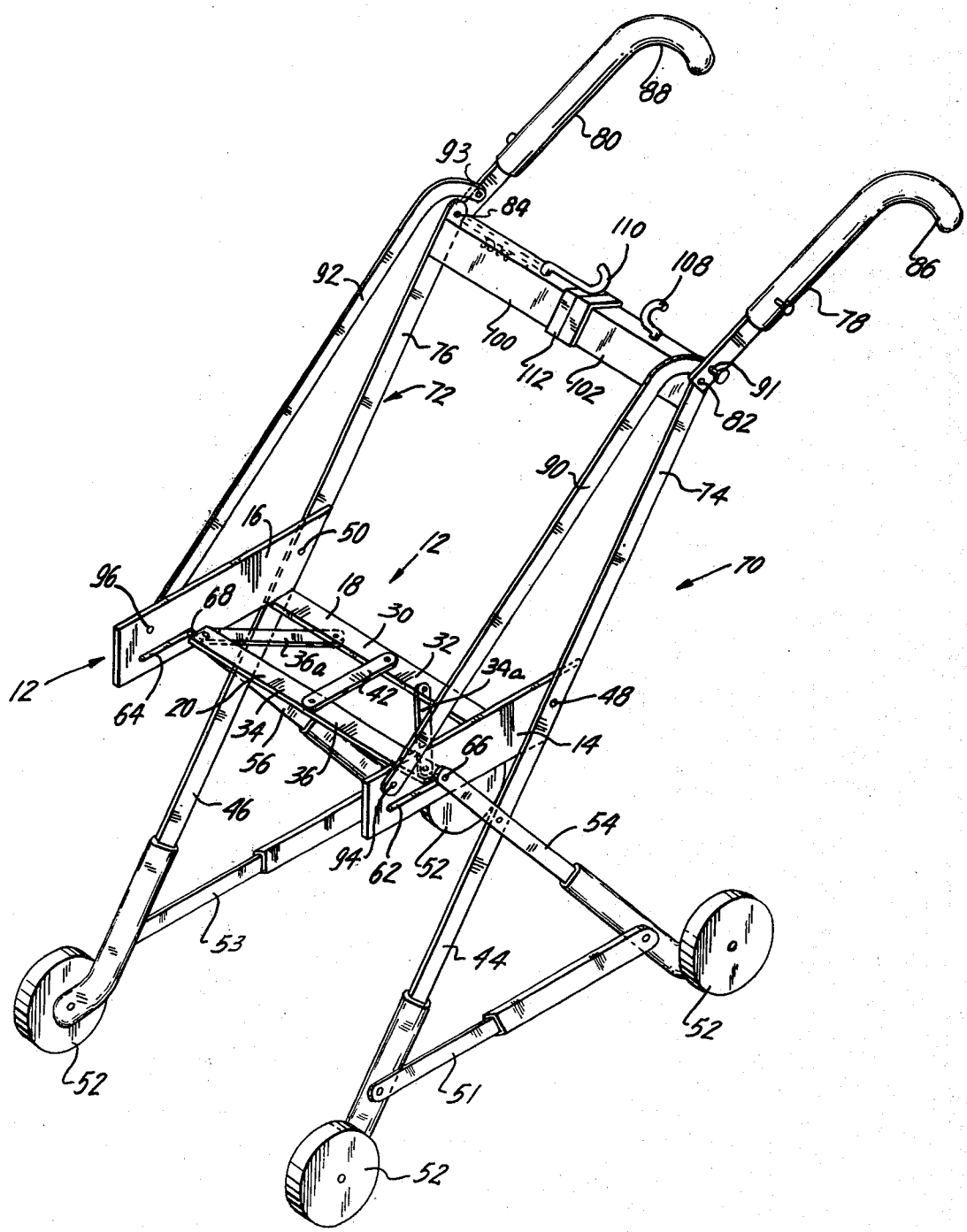
FIG. 4 is a perspective view of the frame of FIG. 1.

Referring now to FIGS. 1 to 6, there is shown a preferred embodiment of the collapsible frame of the invention indicated generally by the numeral 10. The collapsible frame 10 includes seat support means 12 which as shown in FIGS. 1, 2 and 4 includes spaced apart side members 14 and 16, and end members 18 and 20, preferably pivotally connected to each other via pivot means 22, 24, 26 and 28. Each of the end members 18, 20 includes two sections 30 and 32, and 34 and 36 which are pivotally connected to each other by intermediate pivot means 38 and 40, respectively. A longitudinal strut 42 may be employed to link up the intermediate pivot means 38 and 40 with each other. Angled struts 34a and 36a are pivotally connected at one end to sections 30 and 32, respectively. The other end of angled struts 34a and 36a are connected to sliding means 66, 68, respectively which will be described in detail hereinafter.

A pair of front leg members 44 and 46 are pivotally connected at upper portions thereof to either side of said seat support means 12 via pivot means 48 and 50, as shown. Lower portions of said front leg members 44, 46 terminate in rolling means, such as wheels 52 as shown, or rollers, casters and the like.

A pair of rear leg members 54, 56 are slidably engaged at upper portions thereof 58, 60, respectively, with the seat support means 12, preferably at either side member 14, 16 of the seat support means. The rear leg members include rolling means 52 at the lower ends thereof.

In the embodiment shown in FIGS. 1 and 4, the seat support means 12 includes a pair of horizontal slots 62, 64, one disposed in each of said side members 14, 16 and adapted to slideably receive sliding means 66 and 68, respectively, connected to upper portions 58, 60 of the rear leg members 54 and 56, respectively. The slots 62 and 64 preferably extend from a point intermediate the end members 18, 20 of the seat support means 12 toward the front end of the seat support means 12, as shown best in FIGS. 1 and 4.

The sliding means 66 and 68 may comprise rollers, ball bearings, wheels or other conventional rolling means adapted to be retained in and slide along slot means 62 and 64.

As will be seen hereinafter, if desired, the slot means 62 and 64 may comprise track, groove, or rail means adapted to receive and retain the sliding means.

A pair of handle support means 70 and 72 including handle support members 74 and 76 are connected to and extend upwardly from either side of the seat support means 12. In a preferred embodiment, the handle support members 74 and 76 are merely upward extensions of the front leg members 44 and 46 as shown. Handle means in the form of upper handle sections 78 and 80 are pivotally connected via handle pivot means 82 and 84 to said handle support members, said upper handle sections 78, 80 terminating in slidably mounted handles 86 and 88, respectively, which are adapted to rotate within upper handle sections 78, 80 as shown by the dotted lines in FIG. 1. In addition, the handles 86, 88 may be telescopingly deployed in handle support sections 78, 80 as shown so that the handles may be extended or shortened in length as desired.

A pair of side brace members 90 and 92 are each connected at lower portions thereof to either side of the seat support means 12 at 94 and 96, respectively. Upper portions of the side brace members 90 and 92 are pivotally connected via pivots 91, 93 to the lower portions of the upper handle sections 78 and 80.

In a preferred embodiment, pivot-lock means 98 in the form of spring-load plunger arrangements of conventional design are operatively associated with pivots 91 and 93, respectively, or lock handle sections 78, 80 to handle support members 74, 76 to prevent accidental downward pivoting of the handle sections 78 and 80.

Figure 6:
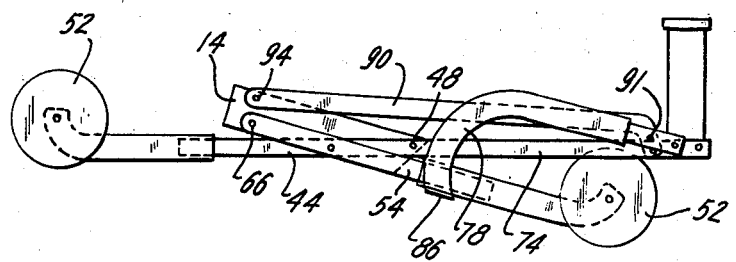
FIG. 6 is a side view of the frame of FIG. 1 in a collapsed state.

When the frame 10 is to be collapsed from the position shown in FIGS. 1 and 4 to that shown in FIG. 6, the pivot-lock means 98 is released and the upper handle sections 78 and 80 are pivoted downwardly toward the front (or back) end of the seat support means 12. This action forces the side brace members 90 and 92 to move downwardly forcing the seat support means 12 to pivot downwardly about pivot means 48 and 50 toward the front leg members as shown in FIG. 6. Downward movement of the seat support means 12 causes the rear leg members 54, 56 to slide forwardly via sliding means 66 and 68 engaged in slot means 62 and 64 toward the front end of the seat support means 12 thereby causing the rear leg members 54, 56 to be lifted upwardly to the rear and behind the seat support means 12 to the positions shown in FIGS. 5 and 6. Thus, in the collapsed position, the seat support means 12 essentially lies adjacent the front leg members 44, 46, and the front leg members 44, 46 extend toward and under the front end of the seat support means 12 while the rear leg members 54, 56 extend toward the rear of the seat support means 12. In order to complete the folding action, the seat support means 12 may be collapsed by moving the longitudinal strut 42 toward the front end of the seat support means 12 thereby causing each of the sections 30, 32 and 34, 36 of the end members 18, 20 to pivot about pivot means 38 and 40 into a V-shape and thereby causing the side members 14 and 16 to move closer to each other to reduce the width of the collapsed frame.

If desired, the frame 10 may also include telescoping leg bracing 51, 53 connecting each of the left front and left rear leg members and right front and right rear leg members as shown in FIGS. 1 and 4.

To open the frame to its working position as shown in FIGS. 1 and 4, the upper handle sections 78, 80 are simply pulled upwardly causing the side brace members 90, 92 to move upwardly pulling the seat support means 12 to a normal substantially horizontal disposition. The rear leg members 54, 56 slide in the slots 62 and 64 via said slide means 66, 68 away from the front end of the seat support means 12, to the rear portion of the slots 62, 64 (which are preferably at an intermediate portion of the side members 14, 16 of the seat support means 12) thereby causing the rear leg members 54, 56 to be pulled into their normal working position.

As shown in FIGS. 2 and 3, the handle support members 74 and 76 may include support strut member 100 designed to maintain the handle support members 74, 76 in a spaced apart sturdy relationship with respect to each other and the rest of the frame 10. The support strut member 100 as shown in FIG. 3 includes bar support 102 having connected thereto a pair of oppositely disposed springloaded pin or plunger members 104 and 106 adapted to engage openings or grooves, (spaced from handle pivots 82, 84) in either side of the handle support members 74, 76. In a preferred embodiment as shown, the plunger members 104 and 106 are adapted to engage openings (or pivots) 91 and 93, respectively and are employed in place of pin or lock means 98. The spring-loaded members 104, 106 include gripping means 108 and 110 employed to simultaneously withdraw the spring-loaded members 104, 106 from their respective openings in the handle support members 74, 76 and thus initiate collapsing of the frame. The bar support 102 may also include intermediate disposed pivot means 112 to facilitate collapsing of the bar support 102 and moving of the handle support members 74, 76 toward each other.

FIG. 7 illustrates yet another embodiment of a preferred collapsible stroller frame identified generally by the numeral 120. The frame 120 includes seat support means 122 similar in structure to that described with respect to FIGS. 1 to 6, a pair of spaced apart front leg members 124 (and 126) upper portions of which are pivotally attached via pivots 128 (130) to the seat support means 122, and a pair of spaced apart rear leg members 132 (134) slidably engaged via slide means 136 (and 138) to the seat support means 122 (via slots 139 (141) thereof) in a manner as described with respect to FIGS. 1 to 6.

Extending upwardly from the seat support means 122 are handle support members 140 (and 142) each of which comprises lower tubular sections 144 (and 146) telescopingly attached to and extending from upper outer sleeves 148 (and 150), respectively. The upper outer sleeves 148 (150) may be fixed to the lower tubular sections 144 (146) by pin-opening arrangements; thus the upper sleeves 148 (and 150) include openings 160 (and 162), respectively, which may be positioned in alignment with one of corresponding openings 164 (and 166) in upper positions of the lower tubular sections 144 (and 146). Spring-loaded plungers 168 (and 170) are connected to the upper outer sleeves 148 (and 150), respectively and when in operating position are adapted to extend into the openings 160 (162) of the outer sleeves 148 (150) and openings 164 (166) of lower tubular sections 144 (146) to fix the positions thereof relative to each other.

Side brace members 172 (and 174) are attached to and extend between the outer upper sleeves 148 (and 150) of the handle support members 140 (142) and the seat support means 122, preferably the slide means 136 (138) disposed in slots 139 (and 141) of the seat support means 122 as shown. The side brace members 172 (174) are of telescoping design wherein a lower inner section 180 (182) thereof is slidably attached to the seat support means 122 while upper outer sections 184 (186) are connected to the upper outer sleeves 148 (and 150) of the handle support members 140 (and 142) as shown. As in the case of the handle support members 140 (142,) the upper and lower sections of the side brace members 172 (174) may include respective openings and spring-loaded plunger arrangements for fixing the position of the two sections relative to each other. In fact, the upper outer sections 184 (and 186) of the side brace members 172 (174) may include a plurality of openings so that the total length of the side brace members may be fixed as desired depending upon the distance that the lower sections 180 (and 182) extend into the upper sections 184 (and 186), respectively.

Furthermore, bar support means 102 including a pair of spring loaded plungers shown in FIG. 4 may be employed to link up the outer sleeves 148 (and 150) with each other to facilitate collapsing and opening of the frame.

The frame 120 may be collapsed by simply releasing spring-loaded plungers 168 (and 170), and moving the outer upper sleeves 148 (and 150) of the handle support members 140 (142) downwardly toward the seat support means 122 which, in turn, causes the upper sections 184 (and 186) of the side brace means 172 (174) to be pulled downwardly and the seat support means 122 to pivot downwardly via pivot means 128 (and 130) into close proximity to the pair of front leg members 124 (and 126). Furthermore, when maximum inward telescoping of the outer and inner sections (184, 186, 180, 182) of the side brace members 172 (174) occurs, the slide means 136 (and 138) are forced to move toward the front end of the seat support means 122 thereby causing the rear leg members 132 (134) to move upwardly to the rear to a collapsed position similar to that shown in FIG. 6.

If desired, as shown in the frames of FIGS. 1 and 7, leg braces 190 (and 192) may connect and give support to the front and rear leg members disposed on either side of the seat support means 12 (or 122). Furthermore, the front leg and rear leg members, and if desired even the leg braces 190 (and 192), may be of telescoping design.

Where the front leg members are of telescoping design, upon collapsing of the frame 10 (or 120), and causing the rear leg members to move upwardly to the rear of the seat support means, the leg braces 190 (and 192) connected to lower sections 194 (and 196) of the telescoping front leg members will move the lower sections to telescope inwardly to a smaller collapsed position. Upon opening of the frame and movement of the rear leg members downwardly to their working position, the leg braces 190 (and 192) will pull the lower sections 194 (and 196) out from the telescoping upper sections 198 (and 200) to a normal working position.

It will also be appreciated that although only a side view of the frame 120 is shown in FIG. 7, the other side not shown will be of the same construction as the side shown and each side will be connected to each other via seat support means end members 18, 20 or other similar means and support strut member 100 and the bar support 102 with its retractable spring-loaded members 104, 106 or other similar connecting means.

As shown in FIG. 8, another embodiment of the present invention is shown, namely, frame 200 which includes handle support members 74 (76), side brace members 90 (92), and seat support means 122 (all operatively connected up as described with respect to FIGS. 1 to 6). Frame 200 also includes front leg members 202 (204) and rear leg members 206 (208) which are of telescoping design and each leg member includes an upper sleeve member 210 (212) and a lower tubular member 214 (216) adapted to slidably engage and move within its respective upper sleeve member. The upper portions of the rear leg members are slidably engaged via sliding means 136 (and 138) in slots 139 (and 141) of the seat support means 122. Each of the telescopic members may include the requisite openings and a spring-loaded plunger arrangement 215 similar to that described with respect to previous figures so that the degree of telescoping of such member may be fixed as desired. Furthermore, leg braces 190 (and 192) connect up the right front and rear leg members, and the left front and rear leg members with each other, as shown. The upper sleeves 210 (212) of each of the telescopic legs are preferably in parallel relation to each other as shown to facilitate automatic withdrawal and extension of the telescopic members.

In collapsing the frame 200 the same action occurs as with respect to the frames 10 and 120 of FIGS. 1 to 7. However, upon release of the plunger 215 and upward and rearward movement of the rear leg members 206 (208), the leg braces 190 (192) will cause the lower tubular members 214 to be pulled into the upper sleeve members 210 of each of the front leg members (telescope inwardly) thereby reducing the size of the frame 200 upon collapsing.

Where it is desired to open the frame 200, the lower tubular members 216 of the rear leg members 206 (208) are extended to the desired length and the rear leg members 206 (and 208) are pulled downwardly away from the handle support members and upper portions of the rear leg members are made to slide away from the front end portion of the seat support means. The result is that the rear leg members are brought to their working position during which time the leg braces 190 (192) extend (telescope outwardly) the front leg members 202 (204) to a desired length.

As in the case of FIG. 7 (frame 120), only a side view of frame 200 is shown in FIG. 8, the other side not shown will be of the same construction as the side shown and each side will be connected to each other via seat support means end members 18, 20 or other similar means and support strut member 100 or other similar means.

It will also be appreciated that in the frames 10, 120, 200, the legs may be of the extensible type (for example, telescoping) so that the frame may be used as a stroller or when the legs are extended to increase their length, the frame may be employed as a highchair or youth chair.

In addition, the handle support members in each of the frames may be extendable or telescoping so that the length thereof may be adjusted to facilitate moving the stroller.

In the frames described above, the right front and rear leg members and the left front and rear leg members may be pivotally connected to each other at leg crossing points as shown in the Figures. Alternatively, the front legs and rear legs may cross each other with one leg passing through a slot in the other leg. In another embodiment of the invention, a clamp or bracket or similar member may be employed to brace the crossing points of the front and rear leg members while allowing the leg members to slide past each other during opening and collapsing of the frame.

As indicated, each of the frames shown in the Figures includes a slot means or track or rail means adapted to engage sliding or rolling means, such as a wheel, roller, caster, cam, pulley, ball bearing, and the like connected to upper portions of the rear leg members. If desired, during actual use of the frame as a stroller and the like, the sliding means may be locked into place to prevent accidental collapsing of the frame. Lock-slide means which may be employed to prevent undesired movement of the sliding means may comprise a simple stop member which may be inserted in the slot means or on the track or rail means. Alternatively, a spring-loaded plunger arrangement may be employed whereby a plunger pin extends through the slot means to prevent undesired movement of the sliding means connected to the rear leg members. In addition, the sliding means may include a hook or other member adapted to be secured to an opening or other means associated with the seat support means to prevent undesired movement of the sliding means.

What is claimed is:

1. A collapsible stroller frame comprising, in combination, seat support means including spaced apart side portions, a rear portion, intermediate portion and front portion, a pair of spaced apart front leg members, said seat support means being pivotally connected to upper portions of said front leg members, a pair of spaced apart rear leg members upper portions of which include sliding means which are slidably engaged by and connected to said seat support means, handle support means comprising an upward extension of said front leg members, a lower portion of which is connected to said seat support means, and an upper portion of which is in telescoping relation to said lower portion, and side bracing means including lower bracing means in communication with said sliding means of said rear leg members, or a portion of said seat support means, and upper bracing means in telescoping relation to said lower bracing means and operatively connected to said upper portion of said handle support means, whereby upon moving said upper portion of said handle support means downwardly toward said lower portion thereby causing said upper bracing means to move downwardly toward said seat support means and said sliding means of said rear leg members to move toward the front portion of said seat support means carrying the rear leg members backwardly swinging said rear leg members upwardly toward the rear of said seat support means, said seat supporting means pivoting downwardly toward said front leg members, so that said front leg members and rear leg members extend in opposite directions when in folded or collapsed condition.

2. The frame as defined in claim 1 further including lock means for fixing the position of said upper portion and said lower portion of said handle support means with respect to each other.

3. The frame as defined in claim 1 wherein said upper bracing means of said side bracing means includes at least two openings and said lower bracing means includes at least one opening adapted to be in alignment with one of said openings of said upper bracing means, and further including a springloaded pin means connected to said upper bracing means in a manner so that said pin means may extend into and be withdrawn from an opening of said upper bracing means and said opening of said lower bracing means, whereby upon with-drawing said pin means from said openings said frame may be collapsed, and upon opening of said frame, said upper portion of said handle support means is moved upwardly carrying with it the upper bracing means which in turn pulls the lower bracing means and said sliding means toward the rear of said seat support means which in turn causes the rear leg members to be pulled down to a working position and said seat support means to pivot away from said front leg members to a substantially horizontal disposition.

4. The frame as defined in claim 3 further including telescoping support strut means connecting said front leg members with said rear leg members.

5. The frame as defined in claim 1 further including telescoping means operatively associated with said front leg members.

6. The frame as defined in claim 5 further including leg strut means connecting said front leg members and rear leg members, whereby upon folding, said rear leg members via said slide means are moved upwardly and backwardly, said leg strut means causing said front leg members to telescope inwardly to a shortened collapsed disposition.

* * * * *